(12) United States Patent
Matsumoto

(10) Patent No.: US 8,743,262 B2
(45) Date of Patent: Jun. 3, 2014

(54) IMAGE CAPTURING APPARATUS AND CONTROL PROGRAM FOR THE SAME

(75) Inventor: Yukihiro Matsumoto, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 12/777,888

(22) Filed: May 11, 2010

(65) Prior Publication Data

US 2010/0302430 A1     Dec. 2, 2010

(30) Foreign Application Priority Data

May 26, 2009    (JP) ................................ 2009-126381

(51) Int. Cl.
*H04N 5/222*    (2006.01)
*H04N 5/238*    (2006.01)
*G06K 9/40*     (2006.01)

(52) U.S. Cl.
USPC ..................... 348/333.08; 396/260; 348/363

(58) Field of Classification Search
USPC ........ 348/333.08, 362, 371, 231.99; 396/287, 396/291, 292; 359/835
See application file for complete search history.

(56) References Cited

U.S. PATENT DOCUMENTS

| 4,812,727 A * | 3/1989 | Sakai et al. .................... 318/696 |
| 5,418,588 A * | 5/1995 | Chigira .......................... 396/463 |
| 5,649,244 A * | 7/1997 | Sato et al. ..................... 396/287 |
| 2005/0134977 A1* | 6/2005 | Fukuda et al. ................ 359/835 |
| 2007/0091202 A1* | 4/2007 | Kawamura .................... 348/362 |

FOREIGN PATENT DOCUMENTS

| JP | 1-164258 A | 6/1989 |
| JP | 2008-114827 A | 5/2008 |
| JP | 2008-209900 A | 9/2008 |

OTHER PUBLICATIONS

Office Action issued on Aug. 20, 2013, in counterpart Japanese Patent Application No. 2009-126381.

* cited by examiner

*Primary Examiner* — Roberto Velez
*Assistant Examiner* — Stephen Coleman
(74) *Attorney, Agent, or Firm* — Carter, DeLuca, Farrell & Schmidt, LLP

(57) ABSTRACT

An image capturing apparatus includes a setting unit for enabling a user to set control values, a display unit for displaying the control values, an obtaining unit for obtaining an aperture value of a lens unit based on luminous information of an object image and the control values set by the user, and a calculation unit for calculating a signal for controlling an aperture of the lens unit according to the aperture value, wherein when the aperture value of the lens unit is a first aperture value, a value based on the first aperture value is displayed and a signal corresponding to the first aperture value is calculated, and when the aperture value of the lens unit is a second aperture value, a value based on the second aperture value is displayed and a signal corresponding to a third aperture value which is different from the second aperture value is calculated.

4 Claims, 5 Drawing Sheets

2-PHASE STOP POSITION

1-PHASE STOP POSITION

2-PHASE STOP POSITION

IMAGE CAPTURING APPARATUS AND CONTROL PROGRAM FOR THE SAME

BACKGROUND OF THE INVENTION

1. Field of the Invention

The present invention relates to an image capturing apparatus which has an electronic view finder function, a control method for the image capturing apparatus, and a computer program for the image capturing apparatus.

2. Description of the Related Art

Conventionally, an electronic still camera which has a moving image monitoring function, i.e. an electronic still camera which has a function (electronic view finder (EVF) or live view function) of outputting an image before image capturing to a monitor or the like, has been known.

In the electronic still camera, predetermined processing is performed on an image signal obtained by a complementary metal oxide semiconductor (CMOS) or a charge coupled device (CCD) by a data processing unit and the like, and then, the image signal is output to the monitor as a moving image. Exposure of the image output to the monitor is controlled by changing control parameters (accumulated time: Tv, aperture: Av, and International Standards Organization (ISO) sensitivity: Sv) so that the image signal becomes a predetermined value. A combination of the three control parameters is fixed in a program line, and, upon obtainment of a signal that causes the image signal to be the predetermined value, a value Ev of object luminance is determined from values of the control parameters, then a value Bv is also determined therefrom. Illustrated below is a relational expression between Ev and Bv and among Tv, Av, and Sv:

$$Ev = Bv + Sv = Tv + Av.$$

Therefore, Tv, Av, and Sv for capturing a still image set by the camera are different from Tv, Av, and Sv for a live view image.

Conventionally, it is possible to set a number of positions at which a rotor stably stops by a cogging torque when energization is cut off to ½ to a number of positions at which the rotor can stop when energization is maintained (Japanese Patent Application Laid-Open No. 01-164258).

However, when an aperture value is controlled based on settings set by a user, it is necessary to maintain the energization for a relatively long time during the live view. In this case, in a conventional electromagnetic driving aperture device which has a stepping motor of a one-two phase driving method, an operation becomes unstable when the energization is cut off at a stop position at which the rotor becomes unstable by discontinuation of the energization. In other words, there is a problem that an operation becomes unstable since it is difficult to specify whether shifting for one step caused by the cogging torque occurs in a small aperture direction or in an open direction.

SUMMARY OF THE INVENTION

According to an aspect of the present invention, an image capturing apparatus includes a setting unit configured to enable a user to set an aperture amount of a lens unit controlled by a stepping motor, an accumulated time of an image capturing unit for receiving light from an object image passed through the lens unit, and a gain of a signal from the image capturing unit, as control values, a display unit configured to display the control values, an obtaining unit configured to obtain an aperture value of the lens unit based on luminous information of the object image and the control values set by the user, and a calculation unit configured to calculate a control signal for controlling an aperture of the lens unit according to the aperture value obtained by the obtaining unit, wherein when the aperture value of the lens unit obtained by the obtaining unit based on the control values set by the user is a first aperture value, the display unit displays a value based on the first aperture value and the calculation unit calculates a signal corresponding to the first aperture value, and when the aperture value of the lens unit obtained by the obtaining unit based on the control values set by the user is a second aperture value, the display unit displays a value based on the second aperture value and the calculation unit calculates a signal corresponding to a third aperture value which is different from the second aperture value.

According to an exemplary embodiment of the present invention, it is possible to provide a live view image of an exposure that is set irrespective of a set value Av when the live view image is controlled by parameters (Tv, Av, and Sv) set by a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
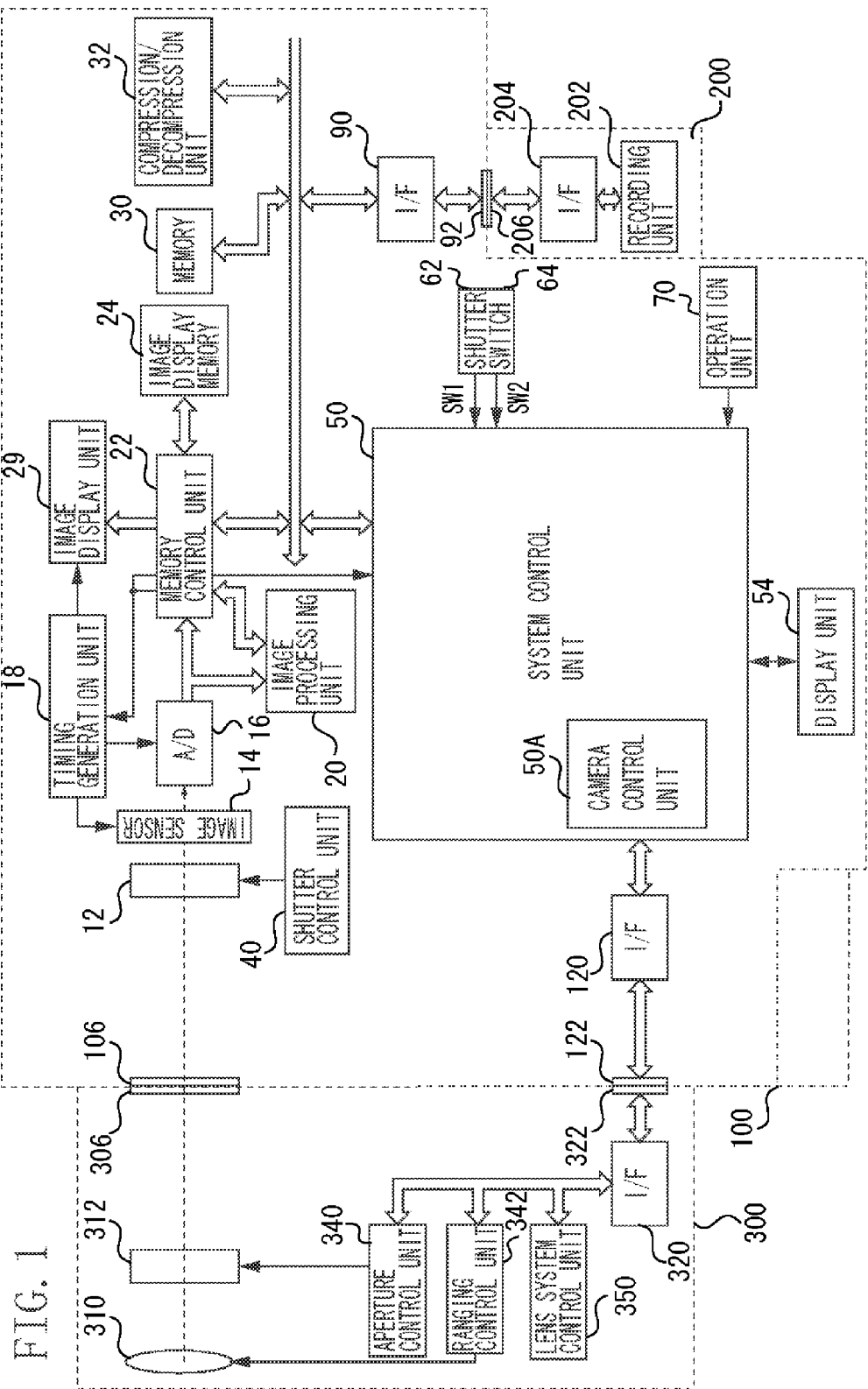
FIG. 1 is a block diagram illustrating an image capturing apparatus and a lens unit.

FIG. 1 illustrates a structure of an image capturing apparatus 100 according to an exemplary embodiment of the present invention. A lens unit 300 can be mounted on the image capturing apparatus 100. An image sensor 14 such as a CCD and a CMOS exposes an object to light for a predetermined time, converts an object image into an electronic signal, and outputs the electronic signal. The image sensor 14 receives light of the object image that has passed through the lens unit. A shutter 12 controls a light exposure amount of the image sensor 14.

A light beam that has entered a lens 310 is guided via an aperture 312, lens mounts 306 and 106, a mirror 130, and the shutter 12 so that an image is formed in the image sensor 14 as the object image by a single-lens reflex type. An analog-to-digital (A/D) convertor 16 converts an analog signal output of the image sensor 14 into a digital signal. A timing generation unit 18 for supplying a clock signal and a control signal to the image sensor 14, the A/D convertor 16, and a system control unit 50 is controlled by a memory control unit 22 and a system control unit 50. An image processing unit 20 performs predetermined pixel interpolation processing and predetermined color conversion processing on data from the A/D convertor 16 or data from the memory control unit 22. Also, the image processing unit 20 detects a correlative shift amount between frames using consecutive two images and a direction of the shift and performs predetermined calculation processing using captured image data as required. Information of luminance of the object image is included in the obtained calculation result. The system control unit 50 calculates (obtains), as an obtaining unit, an aperture value of the aperture 312 of the lens unit, a timing for opening and closing of the shutter 12, and accumulated time of the image sensor 14 based on the luminous information to perform control (automatic exposure (AE) processing).

The system control unit 50 may have another light metering unit and may perform calculation based on information of brightness of the object image from the light metering unit instead of using the luminous information that is the calculation result obtained by the image processing unit 20.

Further, the image processing unit 20 performs predetermined calculation processing using the captured image data and performs automatic white balance (AWB) processing based on the obtained calculation result.

The memory control unit 22 controls the A/D convertor 16, the timing generation unit 18, the image processing unit 20, an image display memory 24, a digital-to-analog (D/A) convertor 26, a memory 30, and a compression/decompression unit 32.

A control signal of the timing generation unit 18 is also input to the system control unit 50, so that the system control unit 50 recognizes a timing of the image capture control.

Data from the A/D convertor 16 are written into the image display memory 24 or the memory 30 via the image processing unit 20 and the memory control unit 22 or via the memory control unit 22.

The image capturing apparatus includes the image display memory 24, the D/A convertor 26, an image output unit 28 which outputs an image to a monitor (not illustrated) outside the camera, and an image display unit 29 which is configured with a thin film transistor liquid crystal display (TFT-LCD). The image display unit 29 can display the object image obtained by the image sensor 14 in such a manner that a user can visually confirm the image.

The memory 30 stores a captured still image and a moving image and is provided with a storage capacity sufficient for storing a predetermined number of the still images and a predetermined time period of the moving image.

Further, the memory 30 may be used as a work area of the system control circuit 50.

The compression/decompression unit 32 performs compression/decompression of image data by way of adaptive discrete cosine transform (ADCT) and the like. The compression/decompression unit 32 reads the image stored in the memory 30 to perform compression processing or decompression processing and writes the processed data into the memory 30.

The system control unit 50 controls the entire image capturing apparatus 100. The system control unit 50 is provided with a camera control unit 50A which, as a calculation unit, calculates a control signal for controlling the aperture 312 via an aperture control unit 340 based on the aperture value calculated by the system control unit 50.

The display unit 54 is a liquid crystal display device that can display an operation state, a message, and the like using a character, an image, a voice, and the like according to execution of a control program in the system control circuit 50. The display unit 54 is provided alone or a plurality of the display units 54 are provided at a position that is easily recognized and in the vicinity of an operation unit of the image capturing apparatus 100. The display unit 54 is configured with, for example, a combination of a liquid crystal display (LCD), a light emitting diode (LED), a sound element, and the like.

A part of the functions of the display unit 54 is provided inside an optical finder 104.

Among display contents of the display unit 54, a compression ratio, a number of recorded pixels, a number of recorded photographs, and a number of photographs that can be taken are displayed on the LCD or the like. Other examples include a shutter speed, an aperture value, exposure correction, a battery level, an error, information using a plurality of digits, an attachment/removal state of the lens unit 300, a communication interface (I/F) operation, date and time, a connection state with an external computer, and the like.

Among the display contents of the display unit 54, those displayed in the optical finder 104 include a focus, completion of preparation for image capturing, a shaking warning, flash charging, completion of flash charging, a shutter speed, an aperture value, exposure correction, a recording medium writing operation, and the like.

Among the display contents of the display unit 54, those displayed in the LED include a focus and the like.

Among the display contents of the display unit 54, those displayed in a lamp or the like include a self timer notification lamp and the like.

Operation units 62, 64, and 70 for inputting various operation instructions of the system control circuit 50 are configured with one of or a combination of two or more of a switch, a dial, a touch panel, pointing by visual line detection, a voice recognition device, and the like. The shutter switch (SW1) 62 is turned on during an operation on a shutter button (not illustrated) to give instructions for starting operations such as autofocus (AF) processing, the AE processing, and the AWB processing.

The shutter switch (SW2) 64 is turned on when the operation on the shutter button (not illustrated) is completed. In response to the turning on of the SW2 64, the system control circuit 50 performs exposure processing for writing a signal read from the image sensor 14 as image data into the memory 30 via the A/D convertor 16 and the memory control unit 22. The system control unit 50 performs development processing utilizing the calculations by the image processing circuit 20 and the memory control unit 22, reads the image data from the memory 30, and causes the compression/decompression unit 32 to compress the read image data. Further, the system control unit 50 issues instructions to start an operation of a series of processing, i.e. recording processing for writing the compressed signal as the image data into a recording medium 200 or 201.

The operation unit 70 includes a dial, various buttons, a touch panel, and the dial for switching image capturing modes of the camera (program, Av priority, Tv priority, manual, etc.). The operation unit 70 serves as a selection unit for changing image capturing parameters (Tv, Av, Sv: ISO) of an image. A menu button 90 is an interface with the recording medium such as a memory card and a hard disk, and a connector 92 connects the menu button and the recording medium such as a memory card and a hard disk.

In the present exemplary embodiment, the image capturing apparatus 100 includes a single system of the interface and the connector for attaching the recording medium thereto. However, the image capturing apparatus 100 may includes one or more systems of the interface and the connector for attaching the recording medium. Further, the image capturing apparatus 100 may have a structure which is provided with an interface and a connector of different standards.

The interface and the connector that are inconformity with the standard of a Personal Computer Memory Card International Association standards (PCMCIA) card, a compact flash (CF, registered trade name), and the like are usable.

An interface 120 connects the image capturing apparatus 100 and the lens unit 300 in the lens mount 106. A connector 122 electrically connects the image capturing apparatus 100 and the lens unit 300. A lens attachment/removal detection unit 124 detects whether the lens unit 300 is mounted on the lens mount 106 or the connector 122.

The connector 122 has a function of transmitting a control signal, a state signal, and a data signal between the image capturing apparatus 100 and the lens unit 30 as well as a function of supplying currents of different voltages. The connector 122 may have a structure capable of performing optical communication and audio communication in addition to the electrical communication.

The recording medium 200 is a memory card, a hard disk, or the like.

The recording medium 200 is provided with a recording unit 202 including a semiconductor memory, a magnetic disk, or the like, an interface 204 with the image capturing apparatus 100, and a connector 206 for connecting the recording medium 200 and the image capturing apparatus 100.

The lens unit 300 is of an exchangeable lens type.

A lens mount 306 mechanically couples the lens unit 300 to the image capturing apparatus 100. The lens mount 306 includes various functions of electrically connecting the lens unit 300 to the image capturing apparatus 100. The lens unit 300 includes the lens 310 and the aperture 312. An interface 320 connects the lens unit 300 to the image capturing apparatus 100 in the lens mount 306. A connector 322 electrically connects the lens unit 300 to the image capturing apparatus 100.

The connector 322 has a function of transmitting a control signal, a state signal, and a data signal between the image capturing apparatus 100 and the lens unit 30 as well as a function of receiving and supplying currents of different voltages. The connector 322 may have a structure capable of performing optical communication and audio communication in addition to the electrical communication.

The aperture control unit 340 uses a stepping motor for controlling the aperture 312. The aperture control unit 340 controls the shutter 12 based on the aperture value calculated (obtained) by the system control unit 50 and the control signal calculated from the aperture value by the camera control unit 50A.

The aperture control unit 340 is described as being provided in the lens unit 300. However, the aperture control unit 340 may be provided in the image capturing apparatus 100 to control the aperture 312 of the lens unit 300.

A focus control unit 342 controls focusing of the lens 310.

A lens system control unit 350 controls the entire lens unit 300. The lens system control unit 350 includes a memory function of storing constants, variables, and programs for operations. The lens system control unit 350 further includes a function as a nonvolatile memory which may store identification information such as a number unique to the lens unit 300, management information, an open aperture value and a minimum aperture value, function information such as a focal length, various current and past setting values, and the like.

Figure 2A:
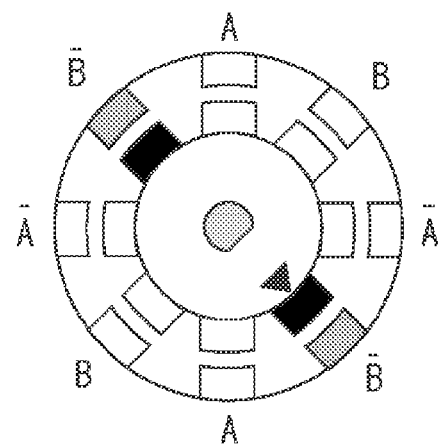
FIGS. 2A to 2C are schematic diagrams illustrating one-phase and two-phase positions of a stepping motor.
Figure 2B:
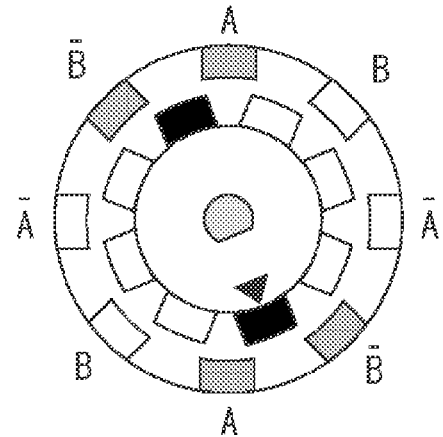
Figure 2C:
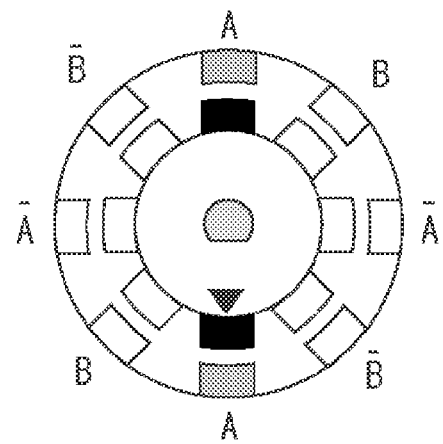

For controlling the aperture 312, a one-two phase driving stepping motor is used in the aperture control unit 340. FIGS. 2A to 2C are schematic diagrams illustrating a stepping motor by one-two phase driving. FIGS. 2A and 2C illustrate two-phase positions and FIG. 2B illustrates a one-phase position. It is necessary to maintain energization to electromagnets A and B to keep the position in FIG. 2B. When the energization to the magnets A and B is cut off, the position is changed to the two-phase position of either one in FIGS. 2A and 2C. Therefore, it is impossible to keep a stop position when the aperture is stopped at the one-phase position and then aperture maintaining energization is cut off. Accordingly, an aperture diameter of the aperture 340 is changed. Further, since a direction of the change is not constant, the aperture diameter of the aperture 340 is fluctuated.

However, since troubles such as heating and an increase in power consumption may be caused when the energization is maintained for a long time without cutting off the aperture maintaining energization, it is necessary to cut off the aperture maintaining energization.

Therefore, for the purpose of maintaining accuracy after the aperture maintaining energization is cut off, it is necessary to stop the aperture at the two-phase position. It is possible to determine whether the aperture stop position becomes the one-phase position or the two-phase position based on whether a driving amount from an aperture standby position is an odd number or an even number. In general, in the case of still image capturing, it is not necessary to cut off the aperture maintaining energization since the longest time of Tv is not more than about 30 seconds. Therefore, whether the aperture stop position is the one-phase or the two-phase is not problematic, and the aperture diameter is not subject to change. On the other hand, since operation time is long in the live view (LV) in which object image display is repeatedly performed on the image display unit 29, energization to the stepping motor is performed only in the case of aperture driving, and the energization to the stepping motor is cutoff after the aperture driving. Accordingly, the aperture driving during the live view is controlled so as to stop at the two-phase position and then to cut off the maintaining energization.

Figure 3:
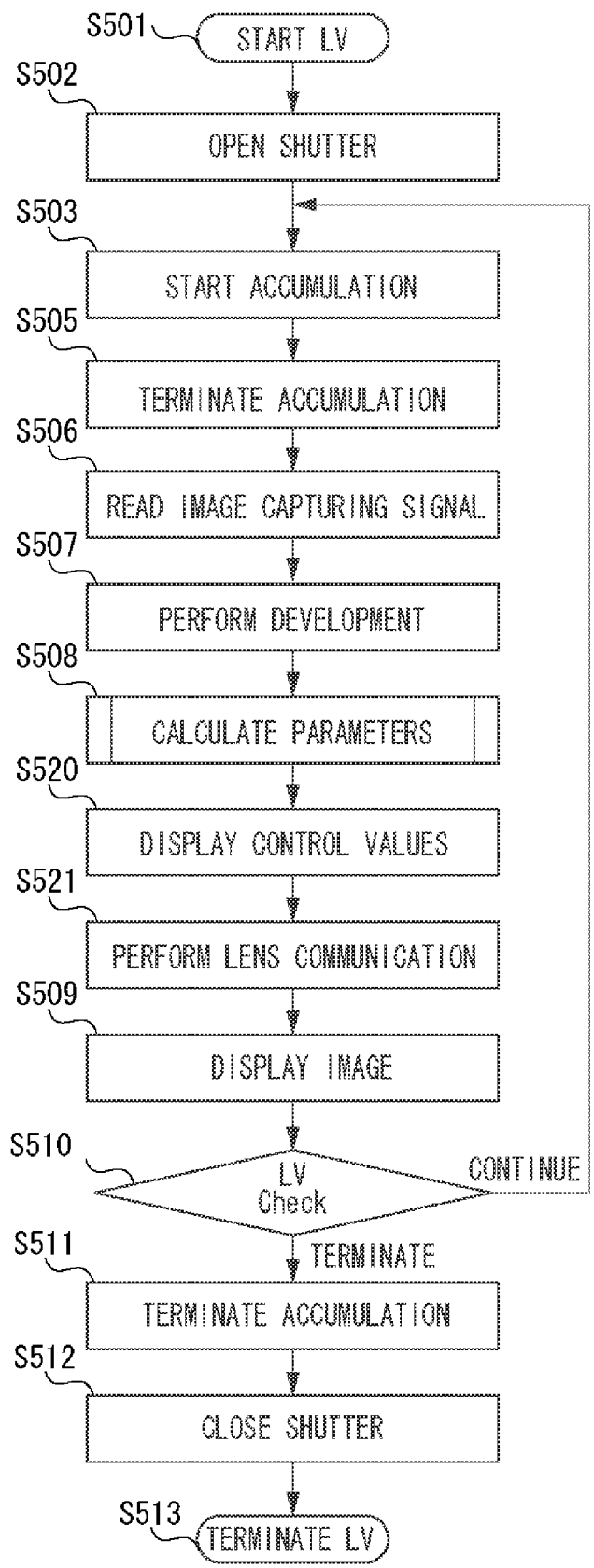
FIG. 3 is a flowchart illustrating a control flow in live view (LV).

FIG. 3 is a flowchart illustrating an image display operation in the live view (LV) according to the exemplary embodiment of the present invention. The system control unit 50 controls processing based on a control program unless otherwise described.

In step S502, when the live view (LV) is started, the system control unit 50 instructs the shutter control unit 40 to open the shutter 12 so that a light beam is made incident to the image sensor 14. Accordingly, in step S503, the system control unit 50 instructs the image sensor 14 to start accumulation.

In step S505, the system control unit 50 terminates the electric charge accumulation operation performed by the image sensor 14 in a predetermined time. In step S506, the system control unit 50 reads an image signal of the object image from the image sensor 14, and then in step S507, instructs the image processing unit 20 to perform development processing. In step S508, the system control unit 50 performs calculations of parameters based on luminous information (light metering value) of the object image which will be described below.

In step S520, parameters set by a user, such as an aperture value AV, and the calculated parameters are displayed on the display unit 54 as required for visual confirmation by the user. In step S521, the camera control unit 50A transmits a control signal for controlling the aperture 312 to the aperture control unit 340 of the lens unit 300.

In step S509, the system control unit 50 displays the object image after the development processing on the image display unit 29 as a live view image.

In step S510, the system control unit 50 determines whether to continue the live view according to an operation by the user. When the system control unit 50 determines to continue the live view (CONTINUE in step S510), the processing returns to step S503 and the series of operation is repeated. On the other hand, when the system control unit 50 determines to terminate the live view according to an operation by the user (TERMINATE in step S510), the processing proceeds to step S511. In step S511, the system control unit 50 terminates the accumulation operation of the image sensor 14. Then in step S512, the system control unit 50 closes the shutter 12.

Figure 4:
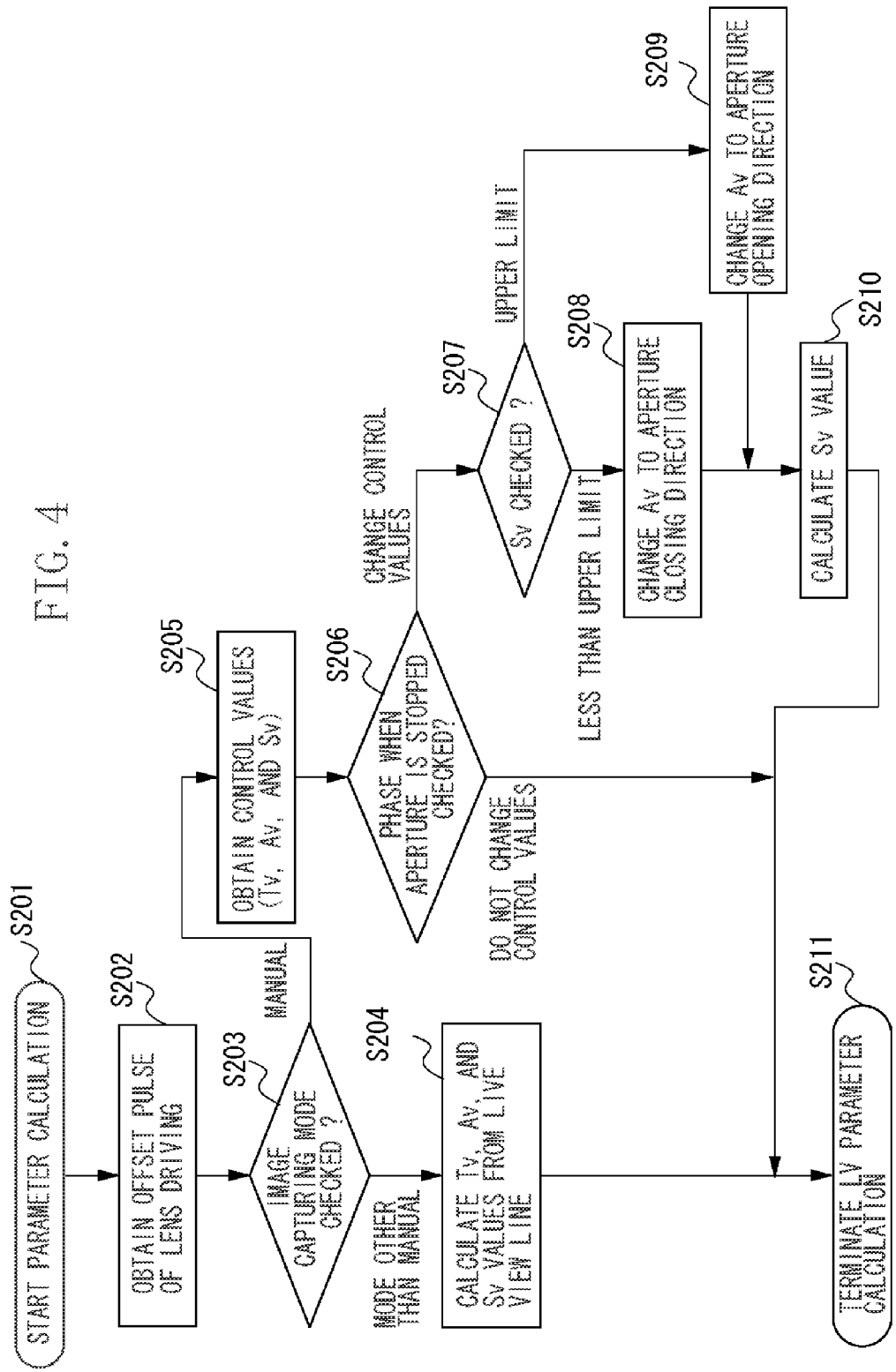
FIG. 4 is a flowchart illustrating a flow for calculating parameters in live view (LV).

FIG. 4 is a flowchart illustrating the parameter calculation in step S509 of the flowchart in FIG. 3.

When the object image is displayed on the image display unit 29, it is necessary to determine accumulation time Tv, an aperture value Av, and an ISO (gain amount) Sv as control parameters for exposure control for obtaining the object image.

In step S202, the camera control unit 50A detects whether there is a difference between an aperture standby position and a lens open aperture position and obtains a pulse number from the lens if there is the difference. In step S203, the system control unit 50 determines whether the image capturing mode of the camera is manual or other according to the dial of the operation unit 70 in order to determine to obtain the control parameters by calculation or to use values set by the user. When the image capturing mode other than the manual mode is set, the processing proceeds to step S204. In step S204, the system control unit 50 calculates the accumulation time Tv, the aperture value Av, and the ISO (gain amount) Sv as the control parameters from the object luminance Ev detected by the image processing unit 20.

When the manual mode is set, the processing proceeds to step S205. In step S205, the system control unit 50 obtains the control values (accumulation time: Tv, aperture: Av, and ISO: Sv) that are set based on the user's operation. In step S206, the camera control unit 50A checks whether a control position of the stepping motor controlled by the aperture value calculated by the system control unit 50 is the one-phase or the two-phase. In other words, the camera control unit 50A checks whether the aperture value enables the stepping motor to remain at the stop position when maintaining energization to the stepping motor is cut off or causes the unstable state. When the aperture value calculated (obtained) by the system control unit 50 corresponds to the two-phase stop position, the camera control unit 50A calculates a control signal corresponding to the aperture value. On the other hand, when the aperture value calculated (obtained) by the system control unit 50 corresponds to the one-phase stop position, the processing proceeds to step S207.

It is possible to determine whether the aperture stop position becomes the one-phase position or the two-phase position based on whether a driving pulse amount from the aperture standby position is an odd number or an even number. Therefore, the camera control unit 50A checks whether a sum of the offset pulse that has obtained from the lens in step S202 and the aperture value to be controlled becomes an even number or an odd number.

In step S207, when the stop position of the stepping motor is the one-phase position based on the aperture value calculated by the system control unit 50, the camera control unit 50A checks whether Sv is the largest possible value. When Sv is not the upper limit value, the processing proceeds to step S208, and Av is increased (to a closing direction). On the other hand, when Sv is the upper limit value, the processing proceeds to step S209, and Av is decreased (to an opening direction). Accordingly, the stop position is controlled to become the two-phase position.

In step S210, the camera control unit 50A calculates Sv for correcting a variation of Av to determine the control parameters.

The upper limit value of Sv is described as the value for changing the stop position to the aperture closing direction in the above description, but the description is not limitative, and the upper limit value may be any value except for the lower limit value of Sv.

Though the variation of Av is corrected using Sv in the above described description, but Tv may be used in place of Sv. However, Sv is used for correcting the variation of Av in the above description for the following reasons. For example, since the values of Tv, Av, and Sv are obtained from a live view line in step S204, both Sv and Tv can be used since a line for a flicker such as that of a fluorescent lamp is separately provided. Accordingly, if the flicker such as that of the fluorescent lamp does not occur, it is possible to use Sv and Tv. However, in the case of the manual mode, the user sets the Tv value. The Tv value may be that obtained by the user after taking the flicker into consideration or that obtained by the user without considering the flicker. Therefore, there is the advantage of placing higher priority to Sv than to Tv for correcting the Av value in the case of the manual mode.

The driving pulse which is the control signal calculated as described above is transmitted to the aperture control unit 340 as described in step S520 in FIG. 3. Therefore, if a position at which the stepping motor can stably stop is not obtained by the aperture value set by the user, the camera control unit 50A transmits a control signal for the aperture 312 which corresponds to an aperture value different from the aperture value displayed on the display unit 54 to the aperture control unit 340.

As to the Sv value (ISO information) and the Tv value displayed on the display unit 54, in the case of performing correction of the Sv value (ISO information) or the Tv value due to calculation of the different aperture value, an Sv value (ISO information) or a Tv value that is somewhat different from that of the case other than the case of the different aperture value calculation.

Figure 5A:
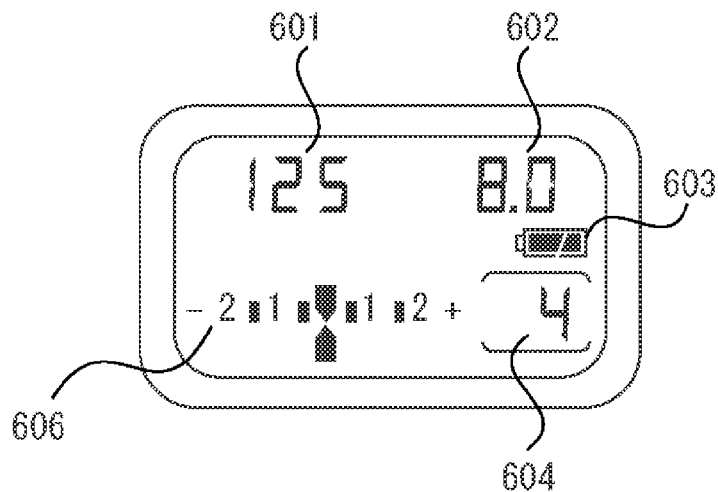
FIGS. 5A to 5C illustrate examples of displays of aperture values Av.
Figure 5B:
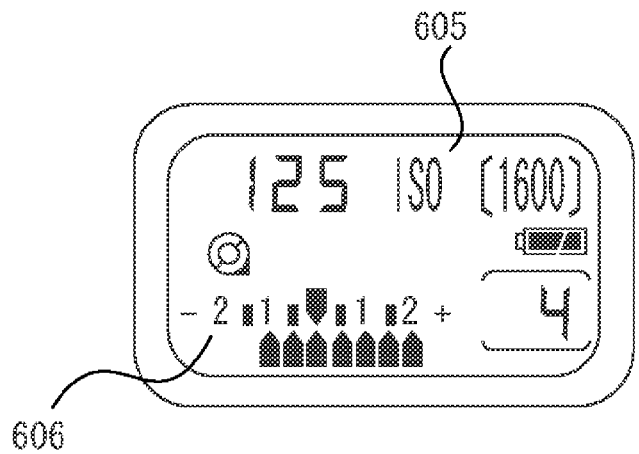
Figure 5C:
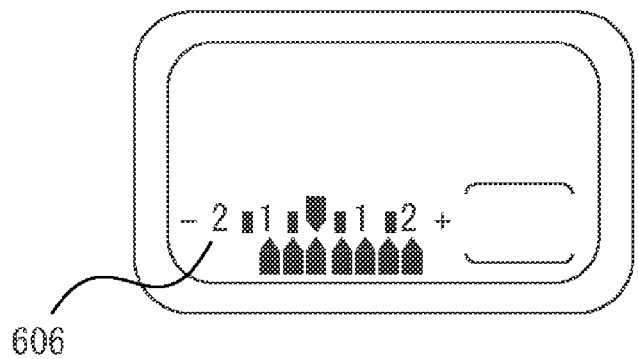

FIGS. 5A to 5C illustrate states in which the parameters such as an aperture value AV set by a user and the calculated parameters are displayed on the display unit 54 for visual confirmation by the user in step S520 in FIG. 3 described above. FIG. 5A illustrates an ordinary display. FIGS. 5B and 5C illustrate states of displaying latitude information. In FIGS. 5A to 5C, the display unit 54 includes a 7-segment display portion 601 for displaying a Tv (shutter speed) value and the like, a 7-segment display portion 602 for displaying an AV (aperture) value, and a battery level display portion 603 of the camera. The display unit 54 further includes a display portion 605 for displaying ISO information (in this case, "ISO" is displayed as illustrated). Also, a display portion 604 for displaying a number of photographs that can be taken, and a bar display portion 606 for displaying an exposure correction amount and a latitude are included.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-126381 filed May 26, 2009, which is hereby incorporated by reference herein in its entirety.

What is claimed is:

1. An image capturing apparatus comprising:
a setting unit configured to enable a user to set an aperture amount of a lens unit controlled by a stepping motor including a rotor, an accumulated time of an image capturing unit for receiving light from an object image passed through the lens unit, and a gain amount of a signal from the image capturing unit, as control values;
a display unit configured to display the control values; and
a calculation unit configured to calculate a control signal for controlling an aperture of the lens unit according to an aperture value,
wherein, when the aperture value set by the user is related to a first aperture value, the display unit displays a value based on the first aperture value and the calculation unit calculates a signal corresponding to the first aperture value,
wherein, when the aperture value set by the user is related to a second aperture value, the display unit displays a value based on the second aperture value and the calculation unit calculates a signal corresponding to a third aperture value by changing either the gain amount or the accumulated time, the third aperture value being different from the second aperture value,
wherein the first and the third aperture values pertain to a first position, in which the rotor does not rotate if the energization to the stepping motor is cut off, and
wherein the second aperture value pertains to a second position, in which the rotor does rotate if the energization to the stepping motor is cut off.

2. The image capturing apparatus according to claim 1, wherein the first and the third aperture values stabilize the stepping motor as compared to the second aperture value.

3. The image capturing apparatus according to claim 1, wherein the calculation unit is a first calculation unit, the image capturing apparatus further comprising a second calculation unit configured to calculate a gain that is different from the gain used as the control value set by the user when the aperture value of the lens unit calculated by the first calculation unit based on the control values set by the user is the second aperture value.

4. A method for controlling an image capturing apparatus which includes a setting unit configured to enable a user to set an aperture amount of a lens unit controlled by a stepping motor including a rotor, an accumulated time of an image capturing unit for receiving light from an object image passed through the lens unit, and a gain amount of a signal from the image capturing unit, as control values, a display unit configured to display the control values, and a calculation unit configured to calculate a control signal for controlling an aperture of the lens unit according to an aperture value, the method comprising:
when the aperture value set by the user is related to a first aperture value, causing the display unit to display a value based on the first aperture value, and causing the calculation unit to calculate a signal corresponding to the first aperture value; and
when the aperture value set by the user is related to a second aperture value, causing the display unit to display a value based on the second aperture value, and causing the calculation unit to calculate a signal corresponding to a third aperture value by changing either the gain amount or the accumulated time, the third aperture value being different from the second aperture value,
wherein the first and the third aperture values pertain to a first position in which the rotor does not rotate if the energization to the stepping motor is cut off, and wherein the second aperture value pertains to a second position in which the rotor does rotate if the energization to the stepping motor is cut off.

* * * * *